United States Patent
Ketelsen

(10) Patent No.: US 7,287,435 B2
(45) Date of Patent: Oct. 30, 2007

(54) INDUCTIVE FLOW METER FOR ELECTRICALLY CONDUCTIVE LIQUIDS

(75) Inventor: Andres Ketelsen, Mauerhof 10, 37124 Rosdorf (DE)

(73) Assignees: Andres Ketelsen, Rosdorf (DE); Broder Ketelsen, Rosdorf (DE)

( * ) Notice: Subject to any disclaimer, the term of this patent is extended or adjusted under 35 U.S.C. 154(b) by 9 days.

(21) Appl. No.: 10/529,018

(22) PCT Filed: Sep. 16, 2003

(86) PCT No.: PCT/EP03/10297

§ 371 (c)(1),
(2), (4) Date: Oct. 11, 2005

(87) PCT Pub. No.: WO2004/031698

PCT Pub. Date: Apr. 15, 2004

(65) Prior Publication Data

US 2006/0144160 A1    Jul. 6, 2006

(30) Foreign Application Priority Data

Sep. 25, 2002  (DE) ................................. 102 44 647

(51) Int. Cl.
*G01F 1/58* (2006.01)

(52) U.S. Cl. .................................................. 73/861.12

(58) Field of Classification Search ..................... None
See application file for complete search history.

(56) References Cited

U.S. PATENT DOCUMENTS 5,750,902 A * 5/1998 Schwiderski ............. 73/861.12
6,865,956 B2 * 3/2005 Yamamoto ................ 73/861.12

FOREIGN PATENT DOCUMENTS

| DE | 1 295 223 | 5/1969 |
| DE | 1573066 | 10/1970 |
| DE | 2622943 | 12/1976 |
| DE | 40 02 030 A1 | 7/1991 |

OTHER PUBLICATIONS

International Search Report May 27, 2004 for PCT/EP03/010297 filed Sep. 16, 2003, 8 pages.

* cited by examiner

*Primary Examiner*—Harshad Patel
(74) *Attorney, Agent, or Firm*—BainwoodHuang

(57) ABSTRACT

An inductive flow meter for conductive liquids includes a flow channel, diametrically opposite measuring electrodes, and a magnetic field generating system generating a magnetic field in a direction substantially perpendicular to a connecting line between the measuring electrodes and perpendicular to the axis of the flow channel. Active surface structures are used to provide a desired shape to the magnetic field such that the magnetic field lines pass to a limited extent via the inner wall of the flow channel to improve measurement accuracy.

7 Claims, 5 Drawing Sheets

INDUCTIVE FLOW METER FOR ELECTRICALLY CONDUCTIVE LIQUIDS

The invention relates to inductive flow meters having the features of the preamble of patent claim 1.

Flow meters of the type considered here are used to determine the flow of electrically conducting liquids through channels or tubes of circular cross section, in particular. In a channel section having an electrically insulating channel wall or tube wall, there are provided at mutually opposite points of a channel cross section punctiform electrodes that are electrically coupled to the electrically conducting liquid, are exposed to the channel interior, in particular, and are connected to the conducting liquid in a conducting fashion. Running perpendicular to the connecting line between the electrodes, and perpendicular to the flow lines of the conducting liquid flowing through the channel or the tube are the field lines of a magnetic field that is generated by a permanent magnet arrangement or, in particular by a coil arrangement. Conductor paths which run from one punctiform electrode to the other punctiform electrode and which penetrate the entire tube cross section or channel cross section of the tube section or channel section containing the electrodes can, when the conducting liquid is moving along the channel or tube, be understood as conductors which are moving in the magnetic field and in which liquid flow induces voltages that are tapped by the punctiform electrodes via connections led through the insulating channel wall or tube wall, and are a measure of the flow of the conducting liquid through the tube or the channel.

Upon closer scrutiny, the output signal of an inductive flow meter of the type described above that can be tapped by the electrodes may be specified as follows:

$$S \sim \int_{(Vol)} (\vec{B} \times \vec{W}) \cdot \vec{v} d(Vol).$$

The integral over the volume is formed by the respective product value of vectors of three vector fields, of which $\vec{B}$ is the magnetic induction in the cylindrical space surrounding the flow channel having the channel inner cross section and having a specific length upstream and downstream of the radial plane containing the electrodes, and $\vec{W}$ denotes a weight vector field that is to be understood as a field of vectors in the previously defined cylindrical space and which characterizes the configuration of the conductor paths between the electrodes in the cylindrical space. Finally, $\vec{v}$ denotes the vector field in said cylindrical space with vectors corresponding to the speeds of the particles of the conductive liquid.

If the values of $\vec{B}$ were constant in modulus and direction (homogeneous magnetic field), and if the values of the weight vector field $\vec{W}$ were corresponding flow paths, constant in modulus and direction, running parallel to one another between parallel electrodes, the partial product $\vec{B} \times \vec{W}$ would be constant in such a way that non-uniform and/or asymmetric velocity distributions of the flow, which is to be investigated, of the electrically conductive liquid through the flow channel section do not lead to measured value falsifications.

It is true that with little effort the magnetic field of the magnetic field generation system can be formed such that it is substantially homogeneous in the region of the interior of the flow channel section, whereas the weight vector field is in no way homogeneous given a flow channel section of round cross section and given essentially punctiform electrodes situated diametrically opposite one another. This is shown directly by the following consideration:

If these essentially entirely overlapping conductor paths are drawn in tube cross sections or channel cross sections, it will be seen that a conductor path concentration is present in the region near the punctiform electrodes in such a way that movements of the conductor paths because of the flow of the conducting liquid in these regions exert a particularly strong influence on the signal that can be tapped from the electrodes.

If they are laminar, characteristic flows in the flow channel section of an inductive flow meter can have a velocity profile that is rotationally symmetrical with reference to the flow channel middle axis in the undisturbed state, or can, given an asymmetric disturbance, exhibit a flow profile whose maximum is offset laterally in the radial direction from the flow channel middle axis. For high flow velocities, the flow can become turbulent in such a way that the flow profile exhibits a plateau area with reference to the flow channel cross section, and areas of lower flow velocity near the edge.

Both deformations of the flow profile as a function of the flow velocity, and asymmetries in the flow profile influence a measurement result obtained with an inductive flow meter of the type considered here in a way that falsifies measured values.

An attempt has already been made in the technical teaching of German patent specification 1 295 223 to inhomogeneously form the magnetic field in a flow channel section of an inductive flow meter in such a way as thereby to counteract the influence of the necessarily present inhomogeneity of the weight vector field on the measurement result given a non-uniform flow distribution over the flow channel cross section. German patent specification 1 295 223 proposes for this purpose that the magnet arrangement, that is to say the magnetic field generation system, be formed such that the field component in the radial plane containing the electrodes, and in planes parallel thereto decreases from the inside to the outside in the direction of the connecting line between the electrodes.

In order to reduce the falsification of measured values owing to non-uniform flow distribution, an attempt has already been made to compensate for the increased influence of the region of the flow cross section near the electrodes on the magnitude of the measurement signal by virtue of the fact that, for example in accordance with the German laid-open patent application 26 22 943, provision was made when generating the magnetic field by means of energized coils of additional compensation coils that generated in the cross-sectional plane of the flow channel section containing the electrodes, or else upstream or downstream thereof, magnetic fields that permeated the flow for generating the induced voltages in the conductor paths in those regions that are to be assigned to the regions located in the immediate vicinity of the electrodes, the orientation of these magnetic fields being directed opposite to the main magnetic field.

The structure of the overall device resulting from this is comparatively complicated, the parts of the magnet system located in the vicinity of the electrodes and which act directly on the region of very high conducting path density requiring very exact mounting and extremely fine focusing.

An inductive flow meter that acts in a similar manner to the device previously considered and has a simplified structure of the magnetic field generation system is described in the German laid-open patent application 400 20 30.

Finally, European patent application, publication number 41 80 33, discloses an inductive flow meter of the type considered here having a main magnetic field generation system which is offset by 90° with reference to the pair of measuring electrodes situated opposite one another and is equipped in each case with pole shoes bearing against the outer surface of the flow channel wall over a restricted angular range of said wall and with auxiliary coils that wrap around these pole shoes and bear closely against the outer surface of the flow channel section over a relatively large angular range in such a way that an approximately sinusoidal magnetic flux distribution of the magnetic field generation system is achieved over a lateral surface, spanning less than 180° in a circumferential direction, of the flow channel wall between the measuring electrodes.

It emerges that with this known inductive flow meter, as well, it is not possible to achieve entirely satisfactory insensitivity of the measurement result to variations, dependent on flow velocity, in the flow profile, and to asymmetric distortions of the flow profile of the flow in the flow channel section.

It is therefore the object of the present invention to configure an inductive flow meter of the general type considered here so as to achieve in conjunction with a comparatively simple design and simple production of the magnetic field generation system a substantially improved insensitivity to measured value falsifications owing to variations, dependent on flow velocity, of the flow profile in the flow channel cross section, or owing to asymmetries in the flow profile relative to the flow channel middle axis.

This object is achieved according to the invention by means of an inductive flow meter having the features in accordance with claim 1. It may be stressed here that an insensitivity to measured value falsifications that is improved by up to an order of magnitude is achieved according to the invention, the designer being offered a surprisingly simple concept for achieving the object for manifold applications.

Advantageous refinements and developments are the subject matter of the patent claims dependent on claim 1, the content of which is hereby expressly rendered a constituent of the description without repeating the wording at this juncture.

Some exemplary embodiments are explained below in more detail with the aid of the drawings, a schematic mode of representation that chiefly illustrates the mode of operation being selected in the drawings, and no value being placed on being true to scale. In the drawings:

FIG. 1 shows a partly sectional perspective illustration of an inductive flow meter of the general type considered here for the purpose of explaining terms and geometric relationships;

FIG. 2 a perspective view of a part of an inductive flow meter for the purpose of explaining how an asymmetric distortion of the velocity vector field in the flow channel cross section relative to the flow channel middle axis influences measured value falsifications;

Figure 6:
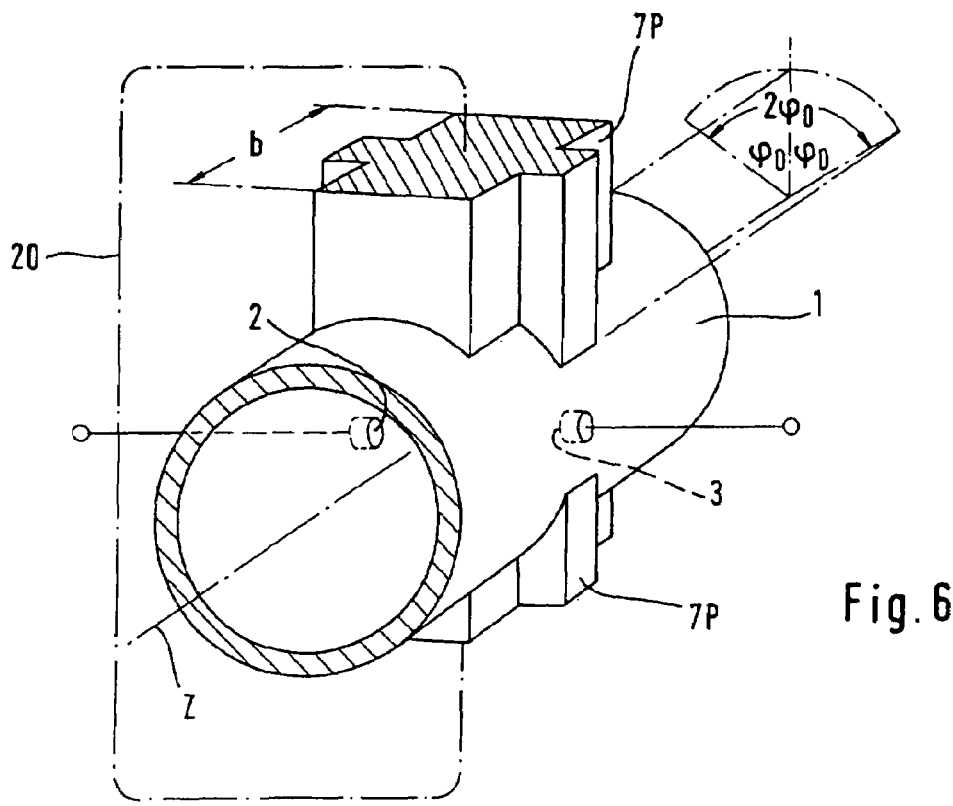

FIG. 6 shows a schematic perspective view of an inductive flow meter of the type specified here, having a magnetic field generation system formed from a magnetic closed circuit with pole shoes; and FIGS. 7A to 7F show developments of the flow channel inner wall in a circumferential region between the midpoint between the measuring electrodes up to a measuring electrode, for various embodiments of an inductive flow meter of the type specified here.

Figure 1:
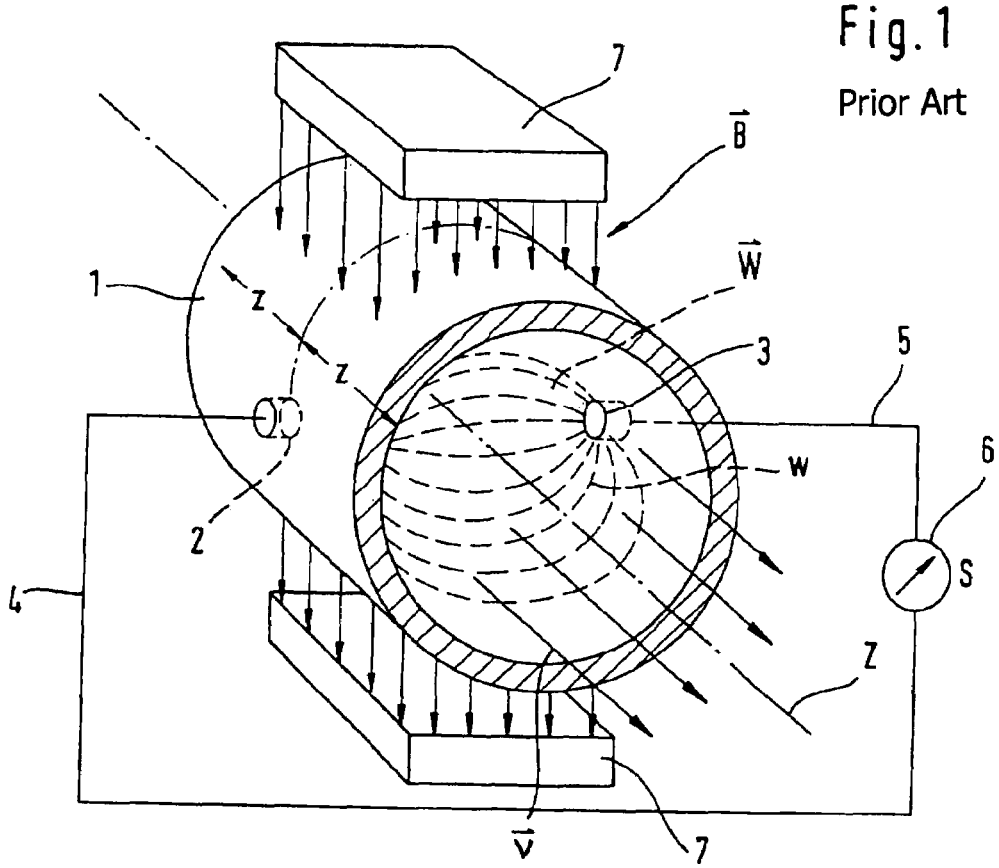

The inductive flow meter of the general type considered here consists in its basic constituents as illustrated in FIG. 1 of a flow channel section 1 in the shape of a tube made from an electrically insulating material. The central longitudinal axis of the flow channel section 1 is denoted by Z. Located in the middle of the longitudinal extent of the flow channel section 1 at locations which are situated diametrically opposite one another over the relevant flow channel cross section are measuring electrodes 2 and 3, which, are, for example, approximately punctiform and are connected to a voltmeter 6 via measuring lines 4 and 5, respectively, that reach through the wall of the electrically insulating flow channel section 1. On the inside of the flow channel section 1, the measuring electrodes 2 and 3 can make direct contact with the electrically conducting liquid flowing through the flow channel section 1, or else can be coupled capacitively to the electrically conducting liquid where a magnetic field generation system of the inductive flow meter is used in a way known to the person skilled in the art to excite alternating current such that, in this case, the measuring electrodes need not lie exposed on the inside of the flow channel section 1. The distance of the cross-sectional plane of the flow channel section 1 containing the measuring electrodes 2 and 3 from the end of said section lying upstream, and from the end thereof lying downstream may be denoted respectively by z.

Finally, a magnetic field generation system 7 is indicated by block symbols in FIG. 1. This system generates an induction vector field $\vec{B}$ represented by vectors of the magnetic induction, the magnetic field lines permeating the wall of the flow channel section 1 and its interior and being oriented substantially perpendicular to the central axis Z and perpendicular to the diametrical line, connecting the measuring electrodes 2 and 3, of the flow channel section.

The length of 2z considered here for the interior of the flow channel section 1 is selected here to be approximately equal to the diameter of the flow channel cross section. A magnetic field is generated by the magnetic field generation system 7 may firstly be assumed for the purposes of explanation in conjunction with FIG. 1 to be homogeneous throughout the interior of the flow channel section 1. If an electrically conducting liquid is now guided through the interior of the flow channel section 1, the flow particles of the liquid have velocities corresponding to the individual velocity vectors of a vector field $\vec{v}$ that are parallel to the central longitudinal axis Z.

A multiplicity of conductor paths that permeate the entire interior of the flow channel section 1 both over the channel cross section and over the length of the flow channel section 1 are indicated by dashed lines w in FIG. 1. If the electrically conducting liquid moves in accordance with the velocity vector field $\vec{v}$ through the flow channel section 1, the conductor paths are then to be understood in accordance with the lines w as conductors moved in the magnetic field and in which electromotive forces are respectively induced because of the movement of the conductor paths in such a way that a resulting induced measuring voltage is finally present between the measuring electrodes 2 and 3 and is measured by the measuring instrument 6 and bears a relationship to the flow rate per time unit of the electrically conducting liquid.

Because of the orientation and the course of the conductor paths, adopted in the electrically conducting liquid, in accordance with the lines w, the electromotive forces induced in the individual conductor paths contribute to a different extent to the measuring signal S that can finally be read off at the measuring instrument 6. This results because, at least in specific sections of their course between the measuring electrodes 2 and 3, the conductor paths have an orientation differing from the course perpendicular to the central longitudinal axis Z and perpendicular to the field lines of the magnetic field, and also exhibit different lengths in each case.

It is justifiable for this reason to consider the conductor path configuration as a conductor path configuration weight vector field $\vec{W}$, this vector system, denoted below for short as weight vector field, taking account of the orientation components of the conductor path course that are responsible for the induction of electromotive forces.

The signal S that can be read out at the voltmeter 6 may be expressed as follows:

$$S \sim \int_{(Vol)} (\vec{B} \times \vec{W}) \cdot \vec{v} d(Vol)$$

If all the vectors of the flow velocity vector field $\vec{v}$ that are parallel to the central longitudinal axis 2 are of the same length, that is to say if the flow velocity is constant over the flow channel cross section, there is a linear dependence of the measuring signal S on the flow velocity, since the product $(\vec{B} \times \vec{W})$ is essentially as an apparatus constant determined by the geometric arrangement in the flow meter.

Figure 2:
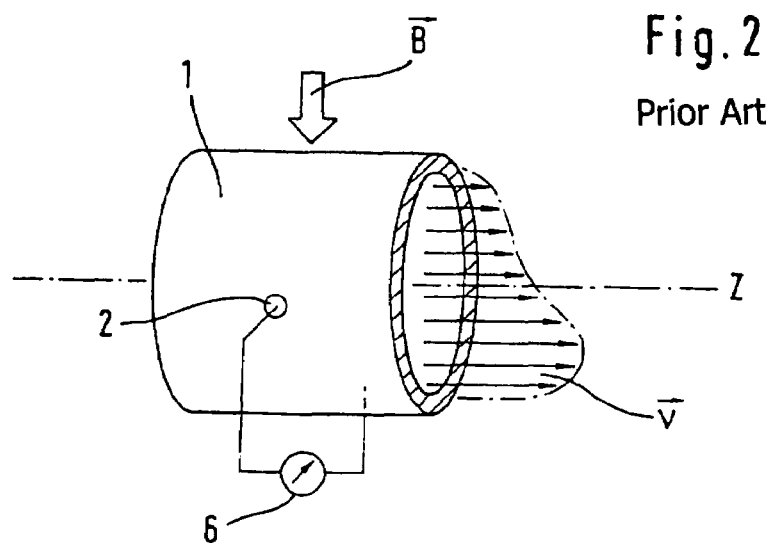
Figure 3:
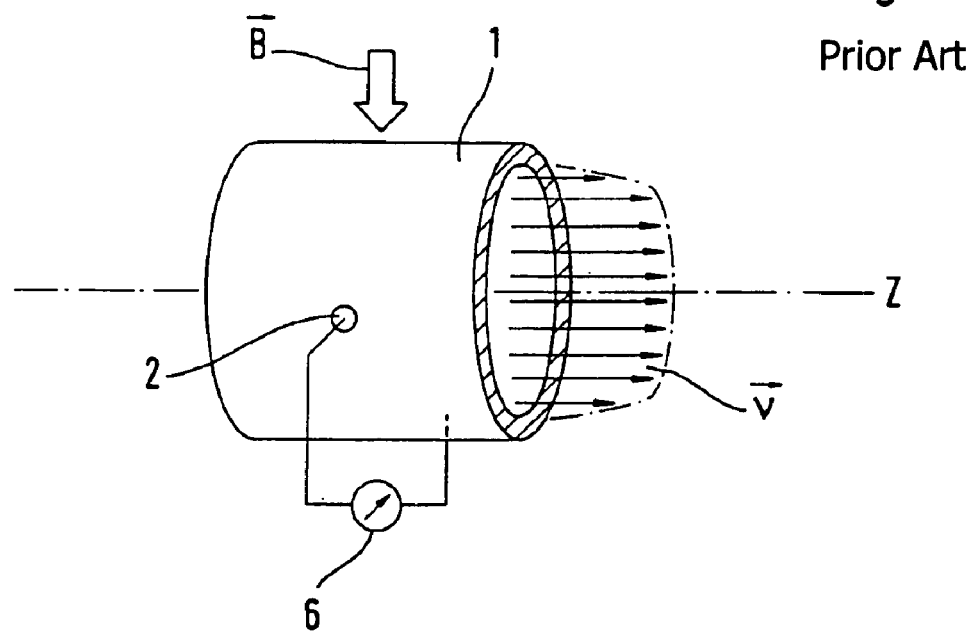
FIG. 3 shows a perspective view of a part of an inductive flow meter for the purpose of explaining how a change in the flow velocity vector field, which is symmetrical in relation to the flow channel middle axis, upon transition from a laminar flow to a turbulent flow influences measured value falsifications.
Figure 4:
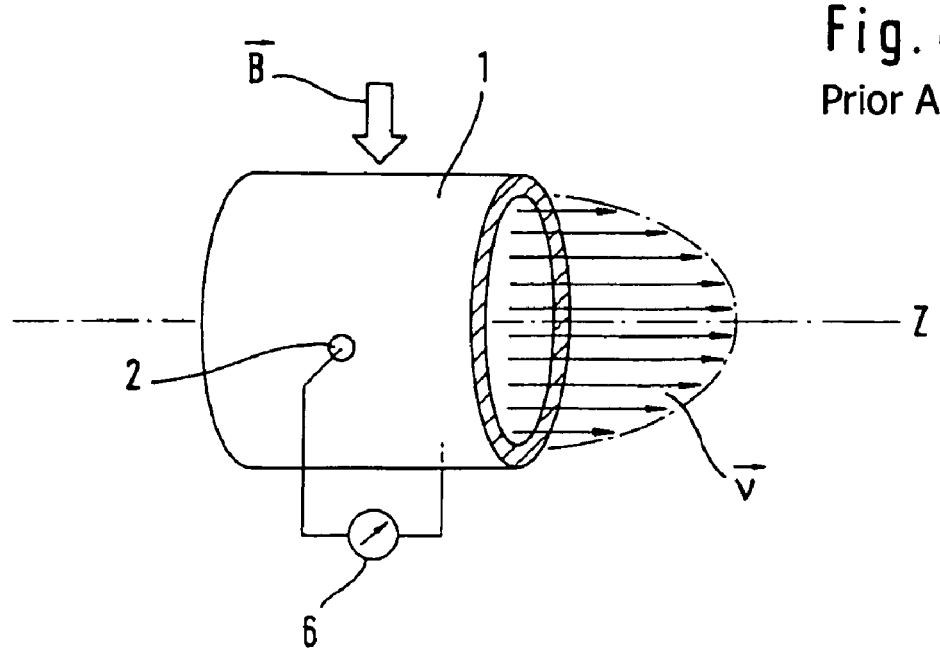
FIG. 4 shows a perspective view of a part of an inductive flow meter through whose flow channel cross section a laminar flow of the electrically conducting liquid passes.

However, for specific cases of operation of the inductive flow meter the velocity vector field $\vec{v}$ suffers specific distortions in practice that will be treated briefly in a purely qualitative fashion with reference to FIGS. 2 to 4.

FIG. 2 shows a vector field $\vec{v}$ of the velocity distribution over the flow channel cross section, in which no rotational symmetry of the flow profile is present with reference to the central longitudinal axis Z of the flow channel cross section 1. The region of maximum velocity vectors of the vector field $\vec{v}$ is offset asymmetrically downward with reference to the central longitudinal axis Z. This velocity distribution can result, for example, from the fact that there are located in the channel sections upstream of the flow channel cross section 1 flow obstacles, for example valve spools, tube bends and the like, the effect of which is that the maximal flow vectors of the flow distribution are located, for example, in the lower quadrant of the tube cross section. However, the region of the maximum can also lie in other quadrants, for example in a cross-sectional quadrant adjoined by the measuring electrode 2 or in a cross-sectional quadrant adjacent to the zenith of the flow channel cross section 1, or else in the cross-sectional quadrant adjacent to the measuring electrode 3.

FIG. 3 shows a situation in which a transition has taken place from laminar flow (see FIG. 4) to a turbulent flow because of high flow velocities in the flow channel section 1. The flow profile is approximated in an axial section by a trapezoidal shape, edge sections of low flow velocity having a relatively low radial thickness. In the region of a laminar flow in accordance with FIG. 4, the flow profile of the vector field $\vec{v}$ has the shape of a paraboloid of revolution that is symmetrical in relation to the central longitudinal axis Z.

Both the position and the size of the asymmetry of the flow profile relative to the central longitudinal axis Z according to FIG. 2, and the basic shape of a flow profile, symmetrical relative to the central longitudinal axis Z, according to FIGS. 3 and 4, and, finally, also a flow profile in the shape of a paraboloid of revolution in the laminar flow region influence the measuring signal that can be read off at the measuring instrument 6 according to FIG. 1 in the sense of a measured value falsification, assuming a homogeneous magnetic field B, since deviations in the practical velocity vector fields $\vec{v}$ from a uniform distribution over the flow channel cross section respectively signify different movements of the conductor paths, illustrated by the linear field w in FIG. 1, of the weight vector field $\vec{W}$, and thus different contributions to the signal S.

It has now been found that the compensation of the influence, acting to falsify the measured value, of the distortion of the flow velocity distribution over the flow channel cross section by a particular shaping of active area arrangements is very successful, these active area arrangements being those areal formations, on which the field lines of the magnetic field generation system respectively penetrate the flow channel inner wall in a restricted fashion. These active area arrangements lie on the flow channel inner wall between the measuring electrodes, and extend circumferentially in accordance with the angle of wrap of pole shoes or field coil arrangements with reference to the flow channel circumference, as well as in an axial direction corresponding to the axial extent of pole shoes or of field coil arrangements, doing so symmetrically upstream and downstream of the flow channel section radial cross section containing the measuring electrode points.

Figure 5:
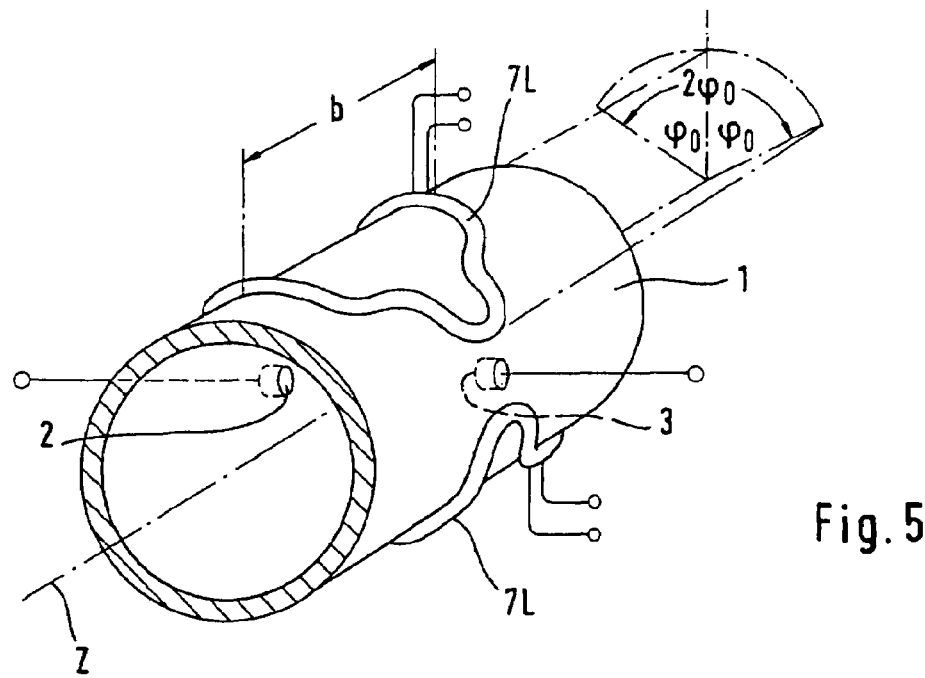
FIG. 5 shows a schematic perspective view of an inductive flow meter of the type specified here, having a magnetic field generation system formed from field coils.

The following may be stated in this regard with the aid of FIGS. 5 and 6:

FIG. 5 shows an embodiment in which the magnetic field generation system assigned to the flow channel section 1 and the measuring electrodes 2 and 3 in the way illustrated is formed by two field coils 7L that closely fit the outer circumferential surface of the flow channel section 1 in the way illustrated, are respectively situated in regions diametrically opposite one another and between the measuring electrodes 2 and 3, and which span an angle of wrap denoted in FIG. 5 by $2\phi_0$. The axial extent of the field coils 7L will in each case amount to b in a position that is symmetrical in relation to the radial plane containing the measuring electrodes 2 and 3.

FIG. 6 shows in a wholly corresponding way a highly schematic perspective view of an inductive flow meter with a closed circuit 20 forming the magnetic field generation system, which supports a field coil (not illustrated), and which has pole shoes 7P that are located opposite one another across the flow channel section 1 and, with reference to the axial extent, are in turn situated symmetrically relative to the radial plane containing the measuring electrode points and have an axial extent b, while in the circumferential direction they surround the flow channel section 1 of round cross section with an angle of wrap of $2\phi_0$ in each case, as is made plain by dashed and dotted lines in FIG. 6.

If a field current is applied to the field coils 7L of the embodiment according to FIG. 5, or if the field coil of the magnetic closed circuit 20 of the embodiment according to FIG. 6 are/is excited, then magnetic field lines of the magnetic fields generated by the field coils or the pole shoes 7 in the interior of the flow channel section 1 permeate the bounding inner wall of the flow channel section 1 in a fashion respectively most largely restricted to cylindrical active area arrangements situated diametrically opposite one another and whose cylindrical shape is essentially in accordance with the teaching given here in order in a surprisingly simple way to compensate for influences, which falsify measured values, of distortions in the flow velocity distribution over the flow channel cross section.

The possible shapes of the active area arrangements can be seen from developments of the cylindrical inner wall of the flow channel section 1 in the circumferential region between the cylinder surface line situated centrally between the measuring electrodes 2 and 3, and the cylinder surface line passing through one each of the measuring electrodes, for example through the measuring electrode 3 in accordance with the illustrations of FIGS. 7A to 7F. In FIGS. 7A to 7F, a dashed and dotted horizontal line R denotes the track of the intersection between the flow channel inner wall and a radial plane containing the measuring electrodes 2 and 3. All the developed views shown extend over a circumferential angular range of $\phi=90°$, and thus respectively constitute a quarter of the inner circumferential surface of the flow channel section 1.

Figure 7A:
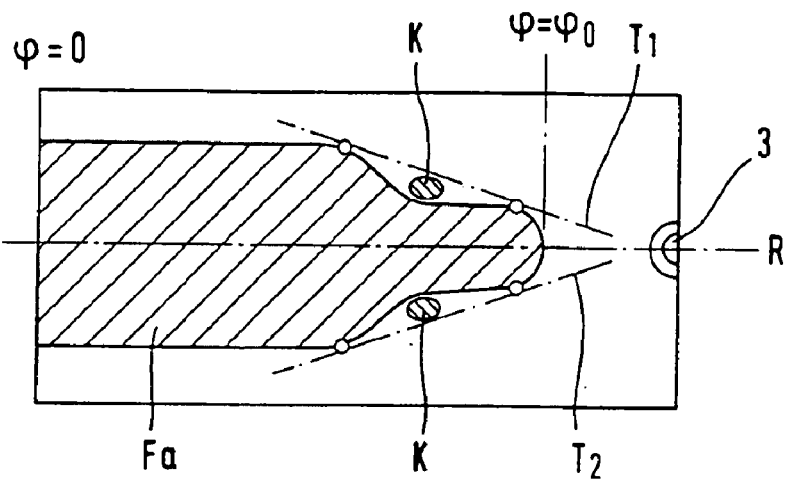

In the case of the embodiment in accordance with FIG. 7A, the active area arrangement is denoted by Fa and corresponds qualitatively to that magnetic field line penetration surface that is generated by the field coil arrangement 7L according to FIG. 5 in a square of the flow channel inner surface.

If bounding straight lines T1 and T2 are drawn in a fashion tangential to the active area arrangement Fa and touch the active area arrangement Fa at two points from outside, the shape of the active area arrangement ensures that these bounding straight lines T1 and T2 converge in pairs in the direction of the respective location of the measuring electrode, that is to say the measuring electrode 3 in the illustrated selected, this condition not being, however, sufficient on its own for the targeted purpose. It is of essential importance that the active area arrangements are shaped such that there are located between the respective two points of contact concave regions K in which the boundary lines of the active area arrangements Fa have no points of contact of any sort with the tangential bounding straight lines T1 and T2, respectively.

Figure 7B:
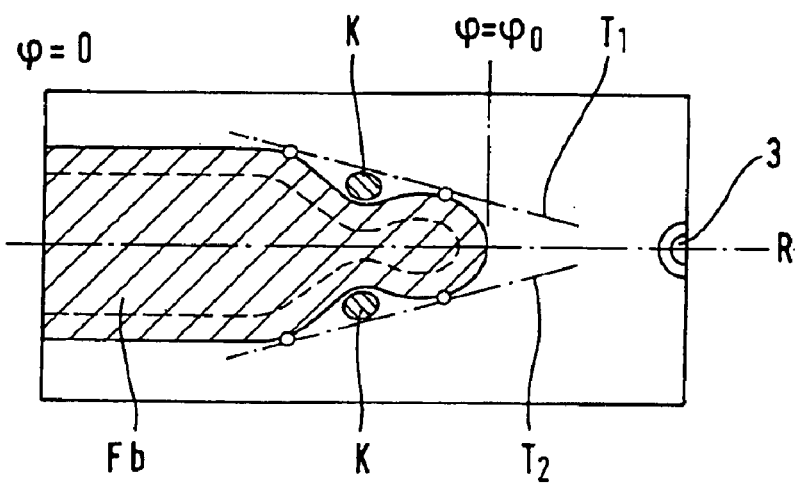

In the case of the embodiment according to FIG. 7B, the active area arrangements Fb are provided by means of constrictions on the basis of corresponding shaping of the field coils 7L in the regions of greater angle of wrap, such that the concave regions K are enlarged. The active area arrangements Fb are, however, still respectively inherently closed.

Figure 7C:
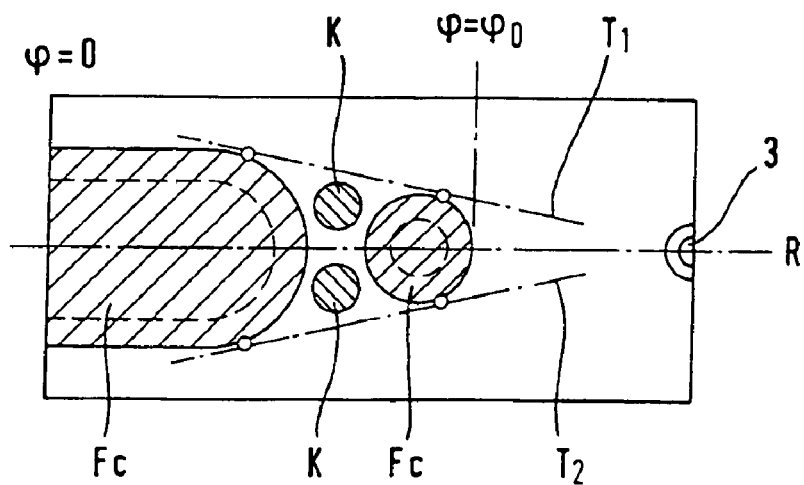

In accordance with the embodiment shown in FIG. 7C, the active area arrangements can also be formed by mutually separate areal formations Fc, which means that there is provided in a specific range of angle of wrap of small extent a main field coil at which, in each case in relatively large ranges of angle of wrap directed toward the measuring electrodes 2 and 3, small auxiliary field coils with the same winding senses as that of the main field coil are located. The concave regions K between the boundary lines of the active area arrangement Fc and the tangential bounding straight lines T1 and T2 can be enlarged further by such a formation if this is desirable in specific cases.

It has emerged that the circumferential extent of the active area arrangements Fa and Fb and Fc in accordance with the angle of wrap $2\phi_0$ of the associated field coil arrangement 7L is in the region of at least 120°, preferably more than 140°, ranges of more than 140° for the angle of wrap leading to surprisingly good results.

If the embodiments according to FIGS. 7A to 7C are considered, it is seen that the active area arrangements Fa and Fb and Fc have their area centroid lying closer to the circumferential center of the flow channel inner surface between the measuring electrodes, while those parts of the active area arrangements that extend further out to the measuring electrodes 2 and 3, respectively, have a lower areal weight. It is to be stated in this regard that very advantageous results are achieved in the sense of the achievement of the object set when each active area arrangement has in a circumferential region from the circumferential center, situated symmetrically between the measuring electrodes, in accordance with $\phi=0$ up to $\phi=\pm\phi_0/2$ at least 65%, preferably more than 75% of its areal content, and respectively correspondingly has at most 35%, preferably less than 25% of its areal content in the circumferential region from $\phi=\pm\phi_0/2$ to $\phi=\pm\phi_0$.

Figure 7D:
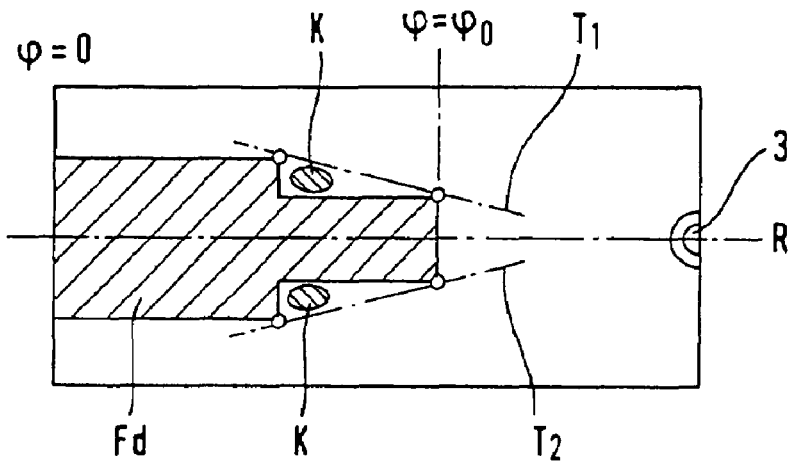

Shown in FIG. 7D, in a way similar to FIG. 7A, in a quadrant of the active area arrangements in the developed view as they are defined by field coil arrangements 7L in accordance with FIG. 5, is the developed view of a quadrant of an active area arrangement Fd such as is defined, for example, by the pole shoe arrangement 7P of the magnetic closed circuit 20 of FIG. 6. Here, as well, tangential bounding straight lines T1 and T2 which are laid at the active area arrangement Fd and respectively touch the active area arrangement Fd at two points from outside converge in pairs in the direction of the respective location of the measuring electrodes, that is to say in the present case to the location of the measuring electrode 3. Lying between the respective two points of contact here, as well, are concave regions K in which the circumferential lines of the active area arrangements have no points of contact of any sort with the tangential bounding straight lines T1 and T2.

Figure 7E:
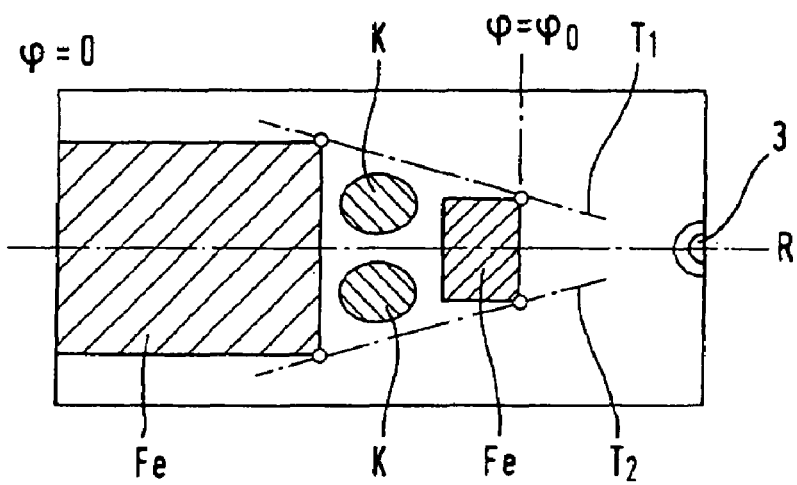

FIG. 7E shows an active area arrangement Fe in which mutually separate active area elements cooperate. It is evident to the person skilled in the art that such an active area arrangement can be defined by pole shoes that, in departure from the arrangement in accordance with FIG. 6, has, instead of the integrally attached relatively narrow pole shoe webs, separate auxiliary pole shoes that respectively bear on both sides of main pole shoes, in a fashion situated between the latter and the measuring electrodes, against the respective circumferential surfaces of the flow channel section 1, and are identically permeated with reference to the main pole shoes. By comparison with the embodiment according to FIG. 7D, the concave regions K have a larger extent in the case of the design of the active area arrangement Fe.

Figure 7F:
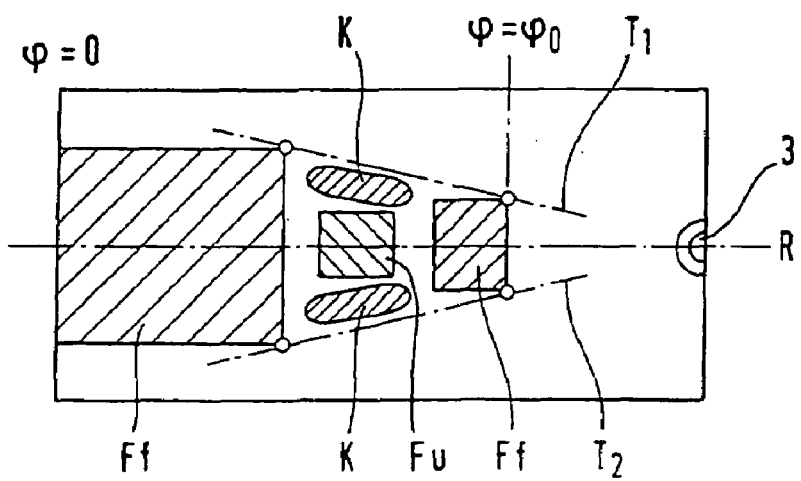

Finally, the illustration of FIG. 7F shows the possibility, in the case of active areas not inherently closed, for example in the manner of FIG. 7C or 7E to arrange between the active area parts symmetrically in relation to both sides of a principle active area element partial surface elements Fu through which field lines of magnetic fields pass that are oriented oppositely to the field lines penetrating the active area arrangements, and which are generated by additional magnetic field generation systems that include additional magnetic closed circuits or additional field coil arrangements. A further improvement in the compensation can be achieved here for specific characteristic distortions of the flow velocity field in the flow channel cross section. However, it is essential that the active area arrangement element lying next to the respective measuring electrode be permeated by field lines that correspond in orientation to those of the main active area arrangement element.

The invention claimed is:

1. An inductive flow meter for electrically conductive liquids, having a flow channel section (1) of essentially circular cross section that is electrically insulating at least on its inner side;

having at least one pair of electrodes (2, 3) that are situated diametrically opposite one another and are electrically coupled to the electrically conductive liquid; and having a magnetic field generation system (7) that is formed either from a magnetic closed circuit (20) with a field coil and with pole shoes (7P) that surround the flow channel section (1) over a specific axial length (b) and at a specific angle of wrap ($2\phi_0$), or by a field coil arrangement (7L) that surrounds the flow channel section (1) over a specific axial length (b) and at a specific angle of wrap ($2\phi_0$), and which system generates a magnetic field that penetrates the flow channel interior in the region upstream and downstream of the measuring electrodes (2, 3) as well as between the measuring electrodes and is oriented substantially perpendicular to the connecting straight line between the measuring electrodes and perpendicular to the flow channel longitudinal axis (Z), and whose field lines respectively penetrate the flow channel inner wall in a restricted fashion on active area arrangements (Fa, Fb, Fc, Fd, Fe, Ff) that are positioned between the measuring electrodes (2, 3) and extend circumferentially in accordance with said angle of wrap ($2\phi_0$) and axially in accordance with said axial length (b);

characterized in that, in a developed presentation of the flow channel inner wall, bounding straight lines (T1, T2) that are laid tangentially against the active area arrangements (Fa, Fb, Fc, Fd, Fe, Ff) and touch the active area arrangements at two points from outside, converge in pairs in the direction of the respective location of the measuring electrodes (2, 3), and there are located between the respective two points of contact concave regions (K) in which the boundary lines of the active area arrangements have no points of contact of any sort with the tangential bounding straight lines.

2. The inductive flow meter as claimed in claim 1, characterized in that the circumferential extent ($2\phi_0$) of the active area arrangement is 125° to 145°, or at least 120°, preferably more than 140°.

3. The inductive flow meter as claimed in claim 1 or 2, characterized in that each active area arrangement (Fa-Ff) has at least 65%, preferably more than 75% of its areal content in a circumferential region from the circumferential center, positioned symmetrically between the measuring electrodes (2, 3) in accordance with $\phi=0$ up to $\phi=\pm\phi_0/2$, and respectively correspondingly has at most 35%, preferably less than 25% of its areal content in the circumferential region from $\phi=\pm\phi_0/2$ to $\phi=\pm\phi_0$.

4. The inductive flow meter as claimed in claim 1, characterized in that the active area arrangements are each inherently closed formations.

5. The inductive flow meter as claimed in claim 1, characterized in that the active area arrangements are each not inherently closed areal formations.

6. The inductive flow meter as claimed in claim 5, characterized by interposed partial active areas (Fu) through which there penetrate field lines of magnetic fields that are oriented opposite to the field lines penetrating the active area arrangements, and are generated by additional magnetic field generation systems that include additional magnetic closed circuits or additional field coil arrangements (FIG. 7F).

7. The inductive flow meter as claimed in claim 1, characterized in that the density of the magnetic field lines in the active area arrangements is substantially constant throughout the latter.

* * * * *